Nov. 21, 1933.  R. F. STEWART  1,936,042
BUTTER CUTTING MACHINE
Filed Oct. 7, 1930    2 Sheets-Sheet 1
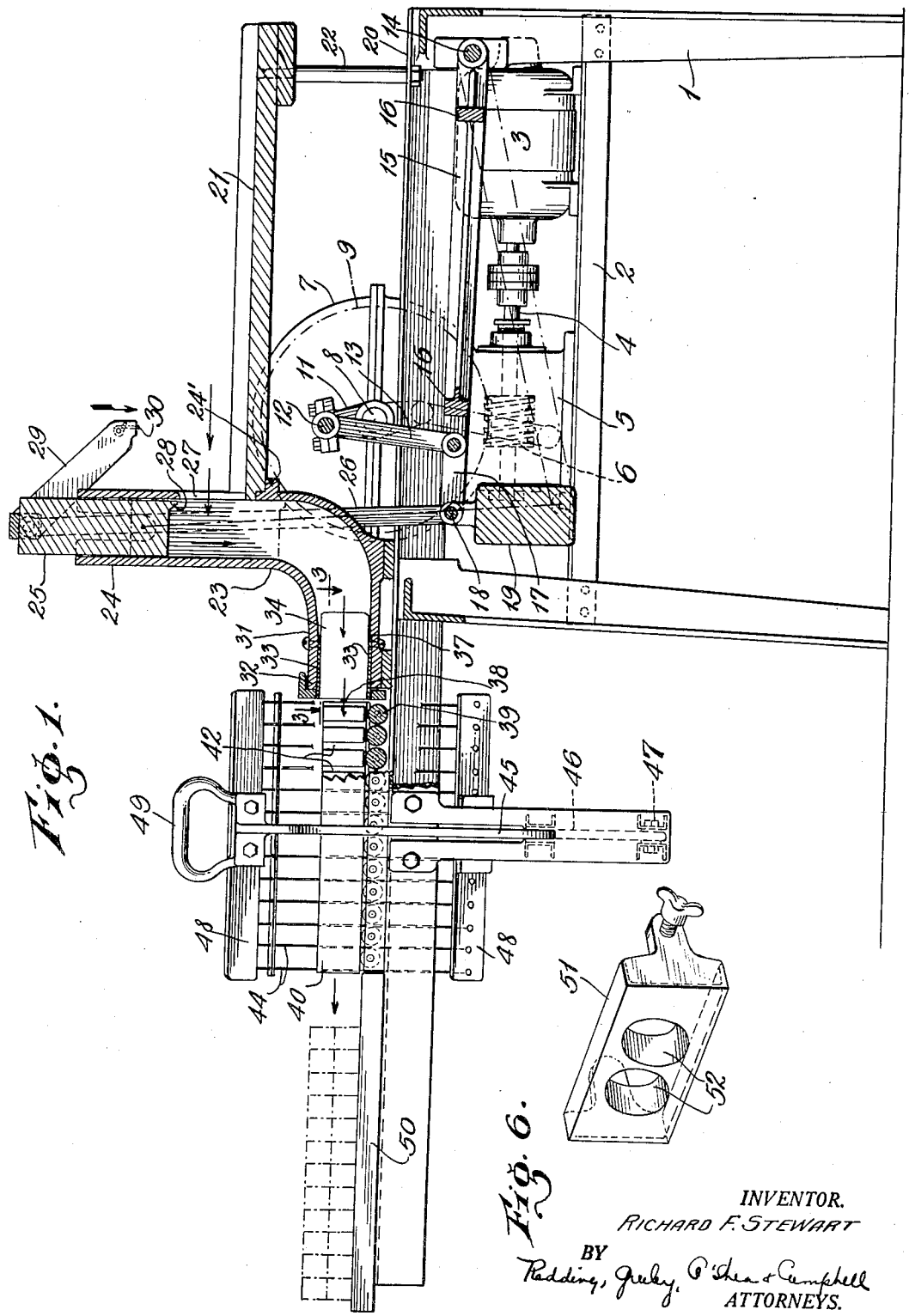
INVENTOR.
RICHARD F. STEWART
BY
Redding, Greeley, O'Shea & Campbell
ATTORNEYS.

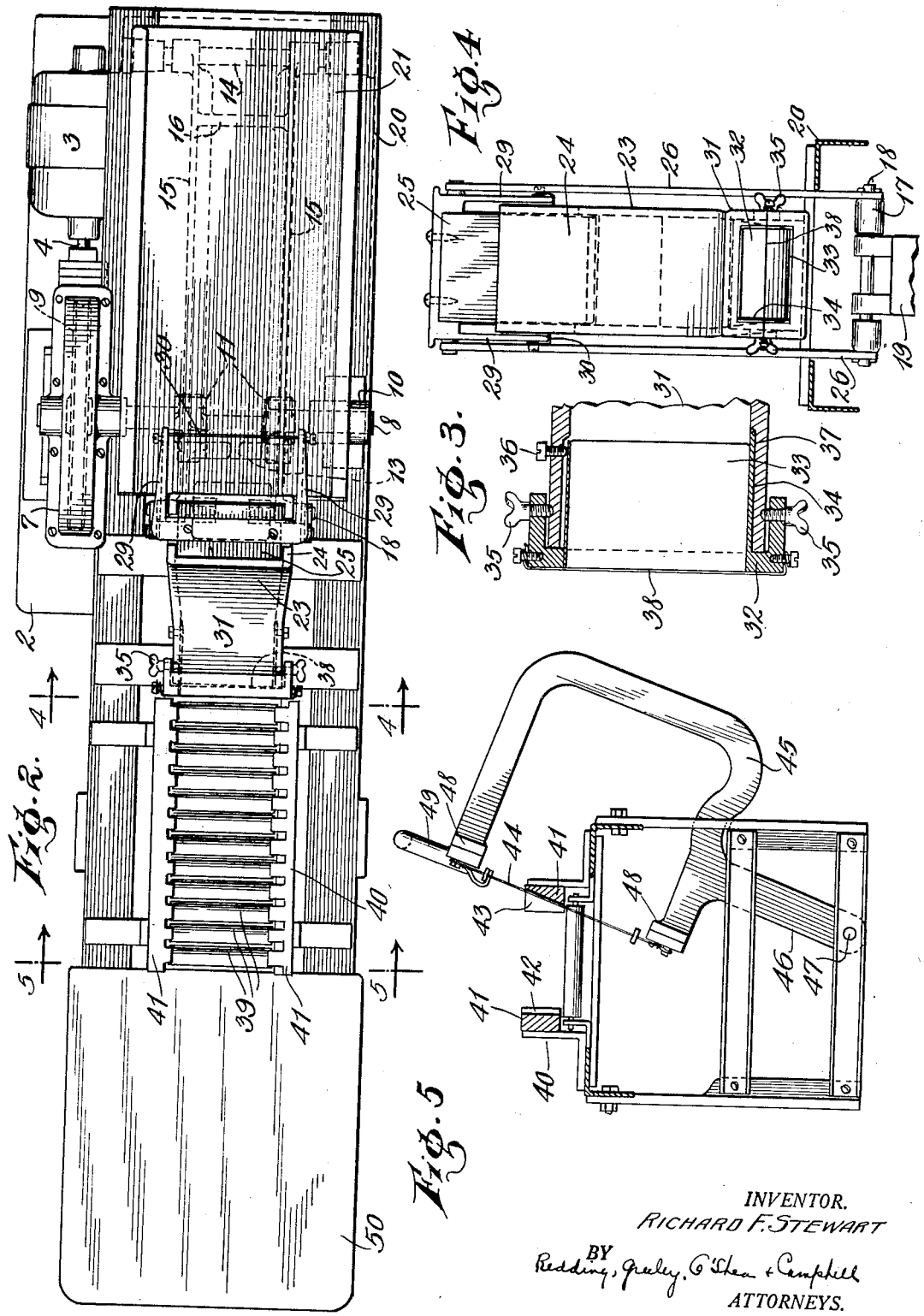

Patented Nov. 21, 1933

1,936,042

UNITED STATES PATENT OFFICE 1,936,042

BUTTER CUTTING MACHINE

Richard F. Stewart, Briarcliff Manor, N. Y.

Application October 7, 1930. Serial No. 486,900

2 Claims. (Cl. 31—14)

The present invention relates to butter cutting machines and embodies, more specifically, an improved cutting machine whereby the manipulation of the butter is reduced to a minimum and the machine elements greatly simplified and reduced in number. It is a matter of common knowledge that the water content of butter is greatly reduced when the butter is manipulated, as when it is forced through dies or shapers under pressure. The corresponding loss in weight is highly objectionable and it is desirable to form suitable prints of the butter with a minimum amount of pressure and manipulation thereof.

With the foregoing in view, an object of the invention is to provide a butter cutting and forming machine, the parts whereof are simple in construction and operation, the number of parts being reduced to a minimum.

A further object of the invention is to provide a machine of the above character, wherein the butter is cut and formed in a minimum number of operations, the pressure being applied to the butter in such fashion that the same is readily shaped and ready to be cut in a single operation.

Further objects, not specifically numerated above, will be apparent as the invention is described in greater detail in connection with the accompanying drawings, wherein:

Figure 1 is a view in side elevation, partly broken away and in section, showing a butter cutting machine constructed in accordance with the present invention.

Figure 2 is a plan view of the machine shown in Figure 1.

Figure 3 is a detail view in section, taken on line 3—3 of Figure 1, and looking in the direction of the arrows, this view showing the spout of the shaping device.

Figure 4 is a view in section, taken on line 4—4 of Figure 2, and looking in the direction of the arrows.

Figure 5 is a view in section, taken on line 5—5 of Figure 2, and looking in the direction of the arrows.

Figure 6 is a view in isometric projection showing a modified form of spout for the mould.

Referring to the above drawings, the frame of a butter cutting machine is shown at 1, having a platform 2 upon which an electric motor 3 is mounted. This motor drives a shaft 4 which is preferably journaled in a housing 5, carried on platform 2, and a worm 6 is keyed to the shaft 4. Housing 5 is formed with a cover 7 and journals a shaft 8 upon which a worm wheel 9 is secured, this worm wheel being indicated in dot and dash lines in Figure 1. Shaft 8 is journaled at its other end in a standard 10 which is preferably carried by the platform 2 and mounts crank arm 11. Between these crank arms a shaft 12 is secured, this shaft carrying a link 13 which is journaled thereon.

Mounted upon the frame 1 of the machine and journaled upon a shaft 14 is a lever formed of parallel side members 15 and transverse members 16. The lever has extensions 17 which carry bers 18. A counterweight 19 is journaled upon a shaft 18. A counterweight 19 is journaled upon the shaft to balance the mechanism described hereinafter.

The machine is formed with a bed 20 upon which a table 21 is mounted by means of vertical standards 22. Upon the bed 20 and intermediate the ends thereof is a butter mold 23 which is shown as formed as one piece and generally in the shape of a reversed L. The vertical portion 24 of the mold receives a head 25 which is restricted by links 26, secured to the shaft 18. Movement of the head thus takes place in a vertical plane between the positions indicated in full lines and in dot and dash lines in Figure 1. The vertical portion 24 of the mold is formed with a flange 24' upon which the adjacent end of the table 21 rests. An aperture 27 is formed in the mold to permit butter to be inserted therein under the head 25. A lip 28 is formed on the head adjacent the aperture and facilitates the biting off of a previously fashioned quantity of butter and forces the same downwardly into the mold. To facilitate the metering of the butter into the mold, and biting off of a sufficient quantity, the head 25 carries arms 29, between which a wire 30 is secured. As the head moves down, wire 30 cuts a quantity of butter from the butter upon table 21 and thus prepares such quantity for reception within the mold.

The horizontal portion 31 of the mold 23 is formed with a spout 32, the orifice of which may be varied by means of the structure shown in Figure 3. This structure includes rearwardly extending top and bottom walls 33 and side walls 34 which are received within the end of the spout. Wing headed screws 35 secure the spout to the horizontal portion 31 of the mold and the cross section of the butter issuing from the spout may be varied by means of an adjusting screw 36. This screw engages one side of the spout and flexes the same inwardly to permit the cross section of the butter to be reduced. By withdrawing the screw 36, the spring effect of the adjacent side of the spout restores the same to its normal position against the side of the mold, thus enabling an adjustment to be made with facility. As shown in Figure 3, it is preferred that the inner surface of the end of the horizontal portion 31 be recessed as at 37 to enable the side and top and bottom walls 34 and 33, respectively, to lie flush with the inner surface of the mold. If it is desired to cut the issuing butter into a plurality of layers, one or more horizontal wires 38 may be stretched across the spout 32, as clearly shown in Figure 3, thus severing the butter into such layers.

The bed of the machine 20 also journals a plurality of rollers 39 which receive the butter and facilitate its movement through a cutting frame 40. The cutting frame includes spaced parallel side members 41 having a plurality of recesses 42 and 43. The recesses 43 slope rearwardly and upwardly to receive wires 44 which are carried upon a yoke frame 45, having an extension 46 which is journaled at 47 upon the bed structure of the machine. Yoke member 45 is formed with parallel jaws 48 between which the wires 44 are connected, a handle 49 being provided to facilitate movement of the wires across the cutting frame. The normal position of repose of the frame is as shown in Figure 5 in which position the wires 44 lie in the recesses 43. When the frame is moved to the left, as viewed in Figure 5, the wires pass between rollers 39 and are received within the recesses 42. During this movement the butter lying within the cutting frame is thus severed transversely into a plurality of sections. From the cutting frame, the butter moves out upon a receiving table 50, from which it is wrapped or treated in any desired fashion.

As shown in Figure 6, the spout 32 may be replaced by spouts having apertures of any desired form, a spout 51 being shown as having cylindrical apertures 52 for forming roll butter. It will thus be seen that the butter may be formed in any desired shape and size, but little manipulation thereof being effected and a minimum of pressure exerted thereon. The moving parts of the mechanism are few in number and effectively counterbalanced to afford a smoothly operating machine. By forming the mold as a single piece, the machine is greatly simplified and the manipulation of the butter is reduced to a minimum.

While the invention has been described with specific reference to the accompanying drawings, it is not to be limited, save as defined in the appended claims.

I claim as my invention:

1. In a butter treating machine, a mold comprising a continuous unbroken channel having vertical and horizontal portions connected by a bend, the said channel being of uniform cross sectional size throughout the vertical portion and having an opening in one side thereof, said channel diminishing in size gradually from the bend to the outer end of the horizontal portion, means in said vertical portion for exerting pressure up on butter within said channel, said means having a cutter connected thereto, whereby upon each pressure exerting operation a slab of butter of predetermined size is cut.

2. In a butter treating machine, a mold comprising a continuous unbroken channel having vertical and horizontal portions connected by a bend, said vertical portion having a feed opening in one side thereof, the said channel being of uniform cross sectional size throughout the vertical portion and diminishing in size gradually from the bend to the horizontal portion, a head mounted for reciprocation in said vertical portion and adapted to move past said opening, a table beside said vertical mold portion and adjacent said feed opening, an arm connected to said head, and a cutter carried by said arm and disposed above said table, whereby movements of said head will cause said cutter to move toward or away from said table.

RICHARD F. STEWART.